United States Patent [19]

Jacobson

[11] 3,894,969

[45] July 15, 1975

[54] PROCESS FOR PRODUCING GERMANIUM-DOPED IRON OXIDES

[75] Inventor: Howard Wayne Jacobson, Wilmington, Del.

[73] Assignee: E. I. du Pont de Nemours & Co., Wilmington, Del.

[22] Filed: July 10, 1974

[21] Appl. No.: 487,261

[52] U.S. Cl. .......................... 252/519; 252/62.3 R
[51] Int. Cl. ............................................. H01b 1/08
[58] Field of Search ......... 252/62.3 R, 62.56, 62.59, 252/519; 423/594, 633

[56] References Cited
UNITED STATES PATENTS

| | | | |
|---|---|---|---|
| 3,425,666 | 2/1969 | Lindquist et al. | 423/594 X |
| 3,737,520 | 6/1973 | Jacobson | 423/598 |
| 3,793,443 | 2/1974 | Arendt | 423/594 |
| 3,826,755 | 7/1974 | Grimes et al. | 252/62.56 X |

Primary Examiner—Jack Cooper

[57] ABSTRACT

A process is provided for the preparation of germanium-doped iron oxide at lower temperatures than previously possible. Such doped iron oxides are useful, for example, in making electronic devices.

10 Claims, No Drawings

PROCESS FOR PRODUCING GERMANIUM-DOPED IRON OXIDES

BACKGROUND OF THE INVENTION

This invention relates to semiconductive iron oxides, and more particularly, to a process for making germanium-doped iron oxide.

Alpha-ferric oxide ($Fe_2O_3$) can be doped with germanium to produce the semiconductive iron oxides $Fe_{2-x}Ge_xO_3$, wherein x is in the range 0.0001–0.05; where x equals 0.05, this corresponds to 3.24% $GeO_2$ in total $GeO_2$ plus $Fe_2O_3$. Such doped iron oxides are particularly useful as thermistors.

The preparation of such germanium-doped iron oxides has required synthesis using high-temperature long-term solid state reactions; see copending commonly assigned U.S. Ser. No. 406,303, filed Oct. 15, 1973, wherein syntheses at 1000°–1200°C. for 48 hours are described in the examples; mixing is there accomplished by ball milling. Hence, a more practical synthesis is needed, using shorter reaction times and lower temperatures.

My U.S. Pat. No. 3,737,520, issued June 5, 1973, describes a "salt-gel" process for the manufacture of fibrous alkali metal hexatitanates.

SUMMARY OF THE INVENTION

This invention is a process for producing germanium-doped iron oxides, having the formula $Fe_{2-x}Ge_xO_3$, where x is in the range 0.0001–0.05. The process is a novel process using a lower temperature than previously possible in the formation of these oxides, and comprises the steps of 1. homogeneously admixing an alkali metal hydroxide with an aqueous solution of a ferrous salt selected from the group consisting of ferrous chloride and ferrous sulfate; germanium tetrachloride; an alkali metal chloride; and an alkali metal sulfate; in relative amounts to produce a gel having a pH in the range 7 to 9,
2. calcining the product of step (1) for at least 0.5 hour at a temperature of 550°–900°C., and
3. leaching the calcined product with an aqueous liquid to remove soluble impurities. The alkali metal compounds are preferably those of Na or K.

The product of step (1) may be plunged directly into an oven preheated to 550°–900°C., or it may be heated up slowly to that temperature. In either event, the product of step (1) may be preheated, for example between 100°–250°C., to dry the gel prior to calcining.

Detailed Description

The process of this invention employs homogeneous mixing, in an aqueous medium, to form a salt-gel precursor of germanium-doped iron oxides, followed by drying and calcination at a temperature in the range 550°–900°C., to form those oxides. As compared with the preparation of these oxides by ball milling and high temperatures solid state synthesis, the present invention presents numerous advantages, including the following. The salt-gel process insures uniform mixing. Lower temperature calcining is much more practical than the longer-term high-temperature solid state synthesis, yet yields a product of better low temperature sinterability. Doping does not occur with the solid state synthesis below about 950°C.; significantly higher temperatures than 950°C. must be used in the solid state synthesis to achieve a significant degree of doping on heating in air, even for several days. The product recovered from calcining the salt-gel product generally requires no additional particle size reduction, unlike the product of the solid state synthesis, which must be milled after the synthesis.

As indicated in the above-mentioned U.S. Ser. No. 406,303, the maximum amount of $GeO_2$ which can be inserted into the alpha-$Fe_2O_3$ crystalline structure is about 3.24 weight percent, based on the total weight of $Fe_2O_3$ and $GeO_2$. This corresponds to x of about 0.05 in the formula $Fe_{2-x}Ge_xO_3$. The amount of $GeO_2$ precursor used in this salt-gel process may, of course, exceed that relative amount of $GeO_2$. Generally, to obtain a significant amount of doping of the iron oxide, the amount of germanium compound used in this process is equivalent to 0.2–8% of the weight of total $Fe_2O_3$ and $GeO_2$ equivalent used; 0.2 weight percent $GeO_2$ in total $Fe_2O_3$ plus $GeO_2$ corresponds to an x of about 0.003 in $Fe_{2-x}Ge_xO_3$.

In the present process, iron is supplied to the reaction system as a ferrous salt precursor, either the sulfate or the chloride. Germanium is supplied as the tetrachloride. The alkali metal chloride and sulfates serve the function of a particle growth medium. The alkali metal hydroxide serves to cause the gel to form. Generally, sodium and potassium are the preferred alkali metal cations used. Sufficient alkali metal hydroxide is used to achieve a final pH of about 7 to 9, preferably about 9.

The amount of alkali metal chloride and sulfate described above is such during the calcining step the mass is wet with salt, but the amount is not so large that the system is liquid. The salt-gel is supported by the growing oxide particles. Generally the total weight of salts is preferably equal to or up to three times the weight of the doped iron oxide formed.

The homogeneously admixed aqueous product is allowed to gel in a relatively shallow container at a depth of less than about an inch, the container preferably being one provided with a non-stick lining of polytetrafluoroethylene or the like. The formation of salt-gels having a thickness of 0.1 to 2 cm. is particularly advantageous for effecting the calcination since at that thickness uniform heat transfer during calcining is insured.

It will be understood that it is not essential to dry the salt gel initially, i.e., to remove water and other gases, provided that the calcination furnace is adapted to accommodate and expel the large quantities of volatiles generated. Preferably, however, the salt-gel is first subjected to a drying temperature, e.g., of 100° to 250°C. for a brief period until all volatiles are removed.

In general a calcination period of at least 0.5 hour is needed in order to effect maximum doping. The doping is time/temperature dependent, however, such that longer times are generally needed when the temperature is in the lower part of the 550°–900°C. calcination range. Conversely, shorter periods are more useful with temperatures in the higher part of the range. In general there is no need to exceed a calcination period of 6 hours.

When reference is made herein to a doped iron oxide, alpha-$Fe_2O_3$ of the hexagonal crystalline structure is meant. X-ray data are discussed below. The calcined product of the present invention generally has a platelet morphology, as seen in microphotographic studies. Where particle size reduction is desirable, such size reduction is easily achieved by milling with steel balls.

The following examples are presented to illustrate this process invention. In the examples and elsewhere in the specification and claims, all parts, percentages and ratios are given by weight, unless otherwise stated. Surface area was determined using a standard BET adsorption apparatus.

Example 1

In a Waring blender 200 g. $FeSO_4.7H_2O$ and 200 ml. distilled water were mixed to obtain a solution; 4.2 g. $GeCl_4$ were added to the solution, while stirring. Then 30 g. NaCl and 30 g. $Na_2SO_4$ were added. Finally, with the blender still running, 50 g. NaOH was added over a 5-minute period; gelling occurred during addition of the last 10 g. NaOH. The final pH was 9.0.

The gel was cast in a shallow dish having a fluorocarbon liner. The gel depth was about 0.5 inch. The gel was dried at 140°C. for 12 hours; the result was a porous brick, which was then crushed into chunks approximately 0.5 inch in diameter. The crushed product was then calcined for 2 hours at 850°C. in a vycor test tube.

The resultant mixture of product and salt was cooled, then leached with hot distilled water until the filtrate was free of sulfate and chloride ions (by $BaCl_2$ and $AgNO_3$ tests, respectively). The product was vacuum dried at 140°C. for 4 hours and found to have a surface area of 0.7 m.$^2$/g. The resultant doped iron oxide contained 3.0 weight percent $GeO_2$, which corresponds to $Fe_{1.954}Ge_{0.046}O_3$.

Example 2

The procedure of Example 1 was repeated except that 0.61 g. $GeCl_4$ and 48 g. NaOH were used. The resultant doped iron oxide had a surface area of 0.6 m.$^2$/g. and contained 0.5 weight percent $GeO_2$, which corresponds to $Fe_{1.992}Ge_{0.008}O_3$.

Examples 3 and 4

The process of Example 1 was repeated up to the calcining step except that 25 g. NaCl, 25 g. $Na_2SO_4$ and 48 g. NaOH were used instead of the quantities in Example 1. Final pH was again 9.0. The doped iron oxide was then produced by calcining two lots; one third of the product was calcined at 550°C. for 6 hours and two-thirds at 750°C. for 4 hours. The surface areas obtained were 13.7 m.$^2$/g. at 550°C. (Example 3) and 3.1 m$^2$/g. at 750°C. (Example 4).

X-Ray Data

The X-ray diffraction patterns of the products of the present invention (850°C. calcining, Examples 1 and 2) were compared with the pattern of alpha-$Fe_2O_3$ and with the pattern of a doped iron oxide ($Fe_{1.95}Ge_{0.05}O_3$ or 3.24% $GeO_2$) prepared by solid state techniques from alpha-$Fe_2O_3$ and $GeO_2$ (1100°C., 48 hours). A Hägg-Gunier camera using $CuK\alpha_1$ radiation was used. The powder pattern was indexed on the basis of the hexagonal alpha-$Fe_2O_3$ lattice. All reflections could be accounted for. No reflections were noted due to the compound $GeO_2$. The lattice parameters were refined by least squares techniques. The unit cell parameters are compared in Table I with the cell parameters (in Angstroms) of alpha-$Fe_2O_3$ reported under ASTM Card No. 13–534.

The volume of each unit cell was also compared and is reported in the right column of Table I. Substitution of a small amount of $GeO_2$ into $Fe_2O_3$ results in a volume shrinkage initially. By increasing the $GeO_2$ concentration, the cell volume increases slowly. This can be accounted for by comparing the ionic radii of high spin $Fe_+^3$ (octahedral) of 0.645 Angstroms with the compensating average of high spin $Fe_+^2$ and $Ge_+^4$ (both octahedral) of (0.78 plus 0.54) divided by 2, or 0.660 Angstroms.

These data show that the crystal structure of the germanium-doped iron oxides prepared by salt/gel techniques in Examples 1 and 2 have a crystal structure the same as that of the germanium-doped oxide prepared by high temperature solid state techniques.

TABLE I

| Composition | Preparation | Wt. % $GeO_2$ | $a°$ Angstroms | $c°$ Angstroms | $V^3$ Angstroms |
|---|---|---|---|---|---|
| alpha-$Fe_2O_3$ | — | — | 5.0317 | 13.777 | 302.07 |
| $Fe_{1.992}Ge_{0.008}O_3$ | salt gel, Ex. 2 | 0.5 | 5.0346 | 13.7488 | 301.81 |
| $Fe_{1.954}Ge_{0.046}O_3$ | salt gel, Ex. 1 | 3.0 | 5.0350 | 13.7477 | 301.83 |
| $Fe_{1.995}Ge_{0.050}O_3$ | solid state, 1100°C./48 hr. | 3.24 | 5.0350 | 13.7477 | 301.91 |

I claim:

1. A process for producing germanium doped iron oxide, $Fe_{2-x}Ge_xO_3$, where $x$ is in the range 0.0001–0.05, comprising the steps of
   1. homogeneously admixing an alkali metal hydroxide with an aqueous solution of a ferrous salt selected from the group consisting of ferrous chloride and ferrous sulfate; germanium tetrachloride; an alkali metal chloride; and an alkali metal sulfate; in relative amounts to produce a gel having a pH in the range 7 to 9, the total weight of alkali metal sulfate and alkali metal chloride being equal to or up to three times the weight of the germanium doped iron oxide formed in said process
   2. calcining the product of step (1) for at least one-half hour at a temperature of 550°–900°C., and
   3. leaching the calcined product with an aqueous liquid to remove soluble impurities.

2. A process according to claim 1 wherein the product of step (1) is plunged directly into an oven preheated to a temperature in the range 550°–900°C.

3. A process according to claim 2 wherein the product of step (1) is dried at temperatures below 250°C. prior to step (2).

4. A process according to claim 1 wherein the product of step (1) is dried at temperatures below 250°C. prior to step (2).

5. A process according to claim 1 wherein the ferrous salt is ferrous sulfate.

6. A process according to claim 5 wherein the alkali metal hydroxide is potassium hydroxide.

7. A process according to claim 5 wherein the alkali metal hydroxide is sodium hydroxide.

8. A process according to claim 5 wherein the pH is about 9.

9. A process according to claim 1 wherein the alkali metal hydroxide is potassium hydroxide.

10. A process according to claim 1 wherein the alkali metal hydroxide is sodium hydroxide.

* * * * *